(12) United States Patent
Meng et al.

(10) Patent No.: US 8,200,797 B2
(45) Date of Patent: Jun. 12, 2012

(54) SYSTEMS AND METHODS FOR AUTOMATIC PROFILING OF NETWORK EVENT SEQUENCES

(75) Inventors: Xiaoqiao Meng, Plainsboro, NJ (US);
Guofei Jiang, Plainsboro (CN); Hui Zhang, New Brunswick, NJ (US);
Haifeng Chen, Old Bridge, NJ (US);
Kenji Yoshihira, Cranford, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1243 days.

(21) Appl. No.: 11/941,759

(22) Filed: Nov. 16, 2007

(65) Prior Publication Data

US 2009/0132865 A1    May 21, 2009

(51) Int. Cl.
*G06F 15/173* (2006.01)
*G10L 15/14* (2006.01)

(52) U.S. Cl. ........................................ 709/223; 704/256

(58) Field of Classification Search .................. 709/200, 709/223; 704/256
See application file for complete search history.

(56) References Cited

U.S. PATENT DOCUMENTS

| | | | |
|---|---|---|---|
| 5,465,321 A | 11/1995 | Smyth | |
| 2005/0131869 A1* | 6/2005 | Xie et al. | 707/3 |
| 2007/0214412 A1* | 9/2007 | Arquie et al. | 715/526 |
| 2008/0300879 A1* | 12/2008 | Bouchard et al. | 704/256 |

OTHER PUBLICATIONS

McDougall, J.; Miller, S.; , "Sensitivity of wireless network simulations to a two-state Markov model channel approximation," Global Telecommunications Conference, 2003. GLOBECOM '03. IEEE , vol. 2, no., pp. 697-701 vol. 2, Dec. 1-5, 2003.*
A. Balachandran, G. M. Voelker, P. Bahl, and P. V. Rangan., "Characterizing User Behavior and Network Performance in a Public Wireless LAN", In Proceedings of ACM SIGMETRICS, 2002.*
Konrad et al., "A Markov-Based Channel Model Algorithm for Wireless Networks", May 2003, Springer Netherlands, vol. 9 Issue 3, pp. 189-199.*
P.Smyth. Clustering Sequences with Hidden Markov Models.
Juang et al, Hidden Markov Models for Speech Recognition, Technometrics, vol. 33 (Aug. 1991), pp. 252-272.
F.Hernandez-Campos, A.B.Nobel, F.D.Smith, and K.Jeffay. Statistical clustering of Internet communication patterns. In *Proc. of Symposium on the Interface of Computing Science and Statistics*, 2003.
W. Lee and S. J. Stolfo. Data mining approaches for intrusion detection. In *Proc. of the 7th USENIX Security Symposium*, Jan. 1998.
A.Lakhina, M.Crovella, and C.Diot. Mining anomalies using traffic feature distributions. In *ACM SIGCOMM*, 2005.
I. Cadez, D. Heckerman, C. Meek, P. Smyth, and S. White. Model-based clustering and visualization of navigation patterns on a web site. *Data Mining Knowledge Discovery*, 7(4):399-424, 2003.
Sarukkai et al, Link Prediction and Path Analysis using Markov Chains, http://www9.org/w9cdrom/68/68.html (1999).

* cited by examiner

*Primary Examiner* — Jeffrey R Swearingen
*Assistant Examiner* — Taylor Elfervig
(74) *Attorney, Agent, or Firm* — Bao Tran; Joseph Kolodka

(57) ABSTRACT

Systems and methods are disclosed that profile event sequences by creating a mixture model from the event sequences; estimating parameters for the mixture model; and applying the mixture model to profile the event sequences.

18 Claims, 15 Drawing Sheets

1. Let $l = 0$ and initialize $\Theta_l$
2. do
3.    $Q(\Theta, \Theta_l) = \sum_{m \in \mathfrak{g}} \log p(S, m|\Theta) p(m|\Theta_l)$
4.    Compute $\Theta_{l+1} = argmax_\Theta Q(\Theta, \Theta_l)$
5.    $l = l + 1$
6. until (convergence criterion is satisfied)

FIG. 4

SYSTEMS AND METHODS FOR AUTOMATIC PROFILING OF NETWORK EVENT SEQUENCES

BACKGROUND

This invention relates to automatic profiling of network event sequences.

The behavior of network objects, such as flows, sessions, hosts, and end users, can often be described by sequences of communication events in the time domain. Understanding the behavior of networking objects such as traffic flows, sessions, hosts, or users are essential in many applications of network measurement and monitoring. Such behavior can often be described by event sequences, where by event sequence refers to a series of events that i) they are affiliated with the same entity, ii) each event is identified by a symbol, iii) symbols take limited discrete values. While many event sequences can be found in a variety of networking scenarios, three example cases include:

TCP SYN/FIN/RST sequences: The TCP protocol signals the start and the end of a TCP connection with packets that are distinguished by flags in the header. The first packet has a SYN flag set; the last usually has the FIN flag set. A TCP connection can also be terminated by a packet with the RST flag set in the header. The arrival of SYN, FIN and RST in a TCP connection forms an event sequence.

SIP-based VoIP call sessions: SIP (Session Initiation Protocol) is the defactor signaling protocol for VoIP services. Because VoIP relies on SIP to setup and tear down call sessions, each session contains SIP control messages like INVITE, ACK and BYE. Such control messages in each session form an event sequence.

Wi-Fi user sessions: In Wi-Fi wireless networks, a user needs to establish a wireless connection with the nearby access point (AP) to access the Internet. In this case, a user session can be defined as the duration between the user joining and leaving the wireless network. A user session is established, secured and terminated through control message exchange between the user and AP. All such messages within a user session become an event sequence.

As a common problem in network measurement and monitoring tasks, operators often seek simple and effective solutions to understand the diverse behavior hidden in a large amount of event sequences—including both the massive normal behavior and potentially the behavior of a small proportion of anomalies.

The system provides for a complete profiling of massive event sequences. Accurate yet information-compact profiling of such event sequences is critical for many network measurement and monitoring tasks. The system can handle the multi-dimensional behavior exhibited by event sequences. That is, the sequence behavior can not be fully described by a single variable or distribution. Instead, it possesses at least two types of important properties: sequential patterns constituted by symbols, and duration between events. In practice, even one type of properties might be difficult to be described precisely. E.g., although the aforementioned TCP SYN/FIN/RST sequence has only three discrete symbols, the system can handle a large number of patterns with the longest pattern having in excess of 100 symbols (based on a trace collected at a gateway router). For duration related applications, the system can provide a precise profiling. Taking the VoIP sequence in FIG. 1 as an example: the duration between ACK and BYE is the actual call duration. This duration is heavy-tailed and ranges from 0 second to more than 2 hours. When both sequential patterns and duration are concerned, the complexity is conceivably much higher.

There are a large number of prior work on modeling or mining sequence-alike data in areas as diverse as speech recognition, bio-informatics, database, database mining and system. In speech recognition field, applied hidden Markov models (HMM) to cluster a string of acoustic units. In database and database mining field, mining sequential patterns have been studied intensively in the past years. Many of these work focus on discovering rules instead of modeling. For example, Internet users' navigation records are modeled by using a mixture model consisting of first-order Markov chains. In system areas, a relevant research direction is to detect anomalies (or intrusion) via mining sequential system states such as system calls.

In networking areas there are few studies on sequence-alike data analysis and applications. Some recent efforts are devoted to inferring properties of traffic flow. Recently, certain work applies various data mining techniques to identify significant patterns or insignificant anomalies from various traffic entities such as flows, Internet backbone traffic and host communication patterns.

SUMMARY

Systems and methods are disclosed that profile event sequences by creating a mixture model from the event sequences; estimating parameters for the mixture model; and applying the mixture model to profile the event sequences.

Advantages of the preferred embodiment may include one or more of the following. The system supports profiling the behavior hidden in massive event sequences. On a given sequence set, the system automatically learns a mixture model which fully captures the sequence behavior including both event order and duration between events. The learned mixture model is information-compact as it classifies sequences into a set of behavior templates, which are described by multiple continuous-time Markov chains. The model parameters are learned in an iterative procedure based on the Expectation Maximization algorithm. Various network management applications can be done: a visualization tool for network administrators to conduct exploratory traffic analysis, and an efficient anomaly detection mechanism. The accuracy of the system and the efficiency of the two applications have been validated with real data traces collected in three network scenarios: TCP packet traces, VoIP calls, and syslog traces in wireless networks. The system produces a convenient manifestation of the massive behavior within a set of event sequences. The method inherently classifies sequences into so-called elephants and mice categories. This opens a door for a variety of exploratory data analysis tasks. The visualization tool can show the produced compact category information and is valuable for network operators to have an intuitive and easy understanding on behavior patterns in large amount of traffic data. Secondly, because the method provides a way to profile activities of network objects, it can be applied to distinguish normally-behaved objects and abnormally-behaved ones. Such a capability is essential for the design of anomaly detection schemes. The continuous-time Markov chain based mixture model captures both sequential pattern and time information. The method is particularly suitable for networking problems. The system can target network behavior that can be described by a sequence of symbols which take values from a limited number of discrete values.

The system provides system operators with tools to conveniently monitor massive traffic.

BRIEF DESCRIPTION OF THE DRAWINGS

FIG. 4 shows an exemplary EM algorithm.

DESCRIPTION

Figure 2:
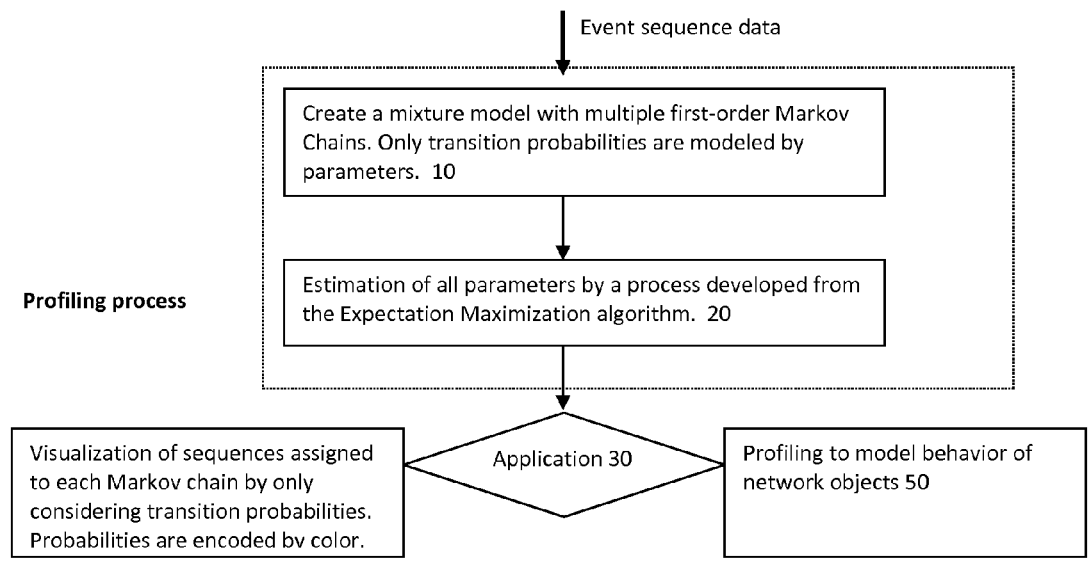
FIG. 2 shows an exemplary process to model event sequences.

FIG. 2 shows an exemplary process for profiling network event sequences. The procedure of event sequence modeling first creates a mixture model (10). In one embodiment, the model includes multiple first-order Markov chains and only transition probabilities are modeled by parameters. Next, the process estimates one or more parameters using the Expectation Maximization process (20). The mixture model is then deployed in an application (30). In one application, visualization of sequences is done (40). The sequences assigned to each Markov chain is visualized by considering the transition probabilities which can be color coded. In another application, the system uses the profile to model the behavior of network objects (50).

The method of FIG. 2 can capture the behavior of massive sequences with compact information. Given a large sequence dataset, the method automatically learns a mixture model which consists of multiple continuous-time Markov chains. The model is general in the sense that it requires little knowledge of the targeting sequences except for the number of discrete symbols. The model is expressive because its structure enables it to capture simultaneously the two aspects of sequence behavior, i.e., sequential symbol pattern and duration between symbols. Also, the model has flexibility of adjusting its sensitivity on either aspect to match application requirements. In model learning process, the system uses maximum likelihood estimation to find values for the model parameters. The estimation procedure is developed from the Expectation-Maximization (EM) algorithm. Although the method does not require prior domain knowledge of the targeting sequences, such knowledge can be utilized to improve model accuracy and to reduce computational complexity. The method is evaluated by applying it to the three aforementioned sequence examples. Evaluation experiments are based on three real data traces, including a TCP packet trace, a syslog trace in wireless networks, and VoIP calls logged at a VoIP testbed set up on PlanetLab. Experiment results demonstrate that the method produces accurate profiles for the real data.

Next, the mixture model approach is discussed in more detail. In a continuous-time Markov chain for TCP SYN/FIN/RST sequences, each transition is labeled by its probability and rate. The rate for any transition adjacent to the "start" and "end" states are infinite because such transitions are considered to take zero time.

The system learns a model from input sequence data. Once the model is learned, it is expected to mimic the sequence behavior. The basic model assumes that an event sequence is independently generated from one out of C Continuous Time Markov Chains (CTMCs), and the sequence is mapped onto a path in it. The approach is also called mixture-model based since the model contains multiple components. Each component characterizes one type of sequence behavior so that the entire model is able to characterize the diverse behavior in massive sequences.

Figure 3:
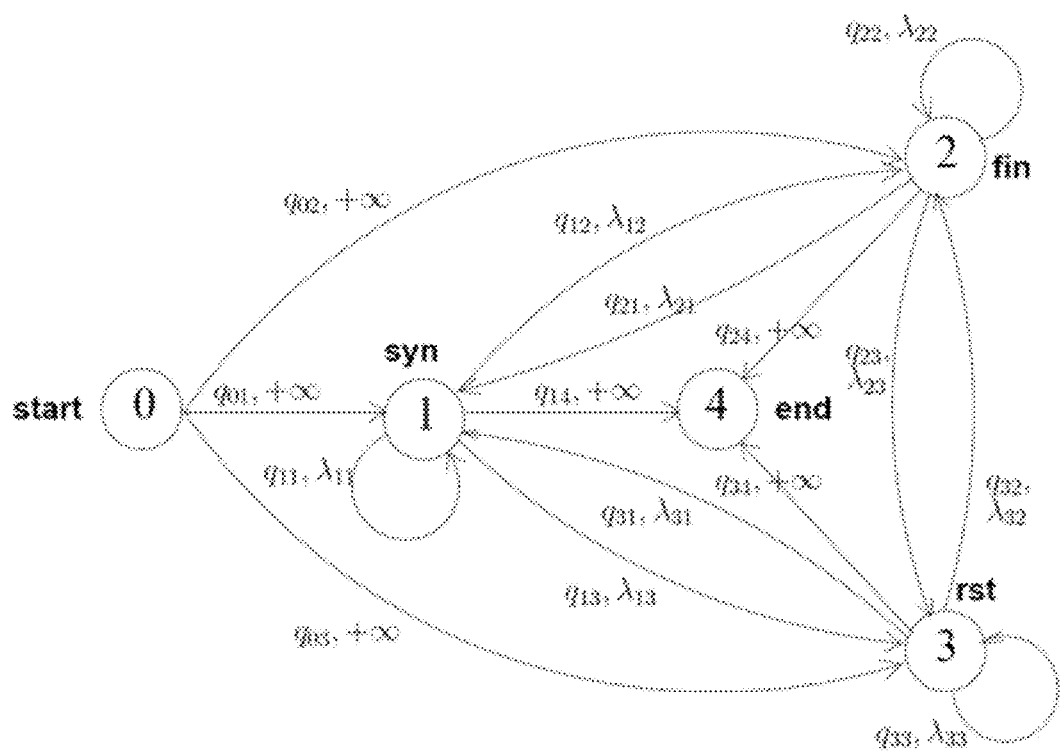
FIG. 3 shows an exemplary continuous time Markov chain for TCP SYN/FIN/RST sequences.

Turning now to the structure of CTMCs, the CTMCs in the mixture model have the same structure. In each CTMC, there is a corresponding state for every discrete symbol value appearing in sequences. In addition, CTMC includes two special states: "start" and "end". CTMC is full meshed, i.e., any state can transit to another state, including the state itself. The only exceptions are: the "start" state has no incoming transitions and the "end" state has no outgoing transitions. For each transition, both its probability and duration are modeled. For the transition from state u and v, its probability is denoted by $q_{uv}$; its delay is assumed to follow an Exponential distribution with a parameter $\lambda_{uv}$, which is also called transition rate. As an example, FIG. 3 shows a CTMC for the aforementioned TCP SYN/FIN/RST sequence.

Given the above structure, any event sequence can be mapped to a path from the "start" state to the "end" state on CTMC. Also, creating such a CTMC only requires to know the total number of discrete symbols. These two features make the model applicable for various event sequences.

To formally describe the problem, S denotes the input sequence set. s denote one sequence instance in S. N denotes the size of S. A complete description of s is a tuple $\{b_1(s), t_{1,2}(s), b_2(s), t_{2,3}(s), b_3(s), \ldots, b_{l(s)}(s)\}$, where $b_i(s)$ is the i-th symbol in s, $t_{i,i+1}(s)$ is the duration between the i-th and i+1-th symbol, and l(s) is the sequence length. M denotes the number of states in each CTMC. M includes the "start" and the "end" state. $\Theta$ denotes the entire parameter set of the mixture model. $\theta^c$ denotes parameters in CTMC c (c=1, ..., C). $\theta^c$ includes all those transition parameters $q_{uv}$ and $\lambda_{uv}$. If necessary, a superscript is added to such transition parameters to specify which CTMC they belong to. For example, $q_{uv}^c$ denotes the transition probability from state u to v in CTMC c.

Given the above notations, the probability of observing a sequence s is given by $$p(s|\Theta) = \sum_{c=1}^{C} \pi_c p(s|\theta^c)$$

where $\pi_c$ is called mixture probability. It is also a parameter included by $\Theta$. $\pi_c$ shall be interpreted as the a priori probability of assigning a sequence to CTMC c. $\pi_c$ must satisfy the constraint $$\sum_{c=1}^{C} \pi_c = 1.$$

Initially, all parameters in the model, $\Theta$, are unknown. The goal is to train the model with input data and find those parameters that best explain sequence behavior in the data. In the next section, an exemplary algorithm for parameter estimation is discussed.

The Expectation Maximization (EM) algorithm is used to derive parameters in the mixture model. EM algorithm is a general method for finding the maximum likelihood estimate for model parameters when the observed data is incomplete. The procedure of EM algorithm is shown in FIG. 4 and presented below

| 1. | Let l = 0 and initialize $\Theta_l$ |
| 2. | do |
| 3. | $Q(\Theta, \Theta_l) = \sum_{m \in \partial} \log p(S, m \mid \Theta) p(m \mid \Theta_l)$ |
| 4. | Compute $\Theta_{l+1} = \text{argmax}_\Theta Q(\Theta, \Theta_l)$ |
| 5. | l = l + 1 |
| 6. | until (convergence criterion is satisfied) |

In the above algorithm, the estimate for $\Theta$ is updated in an iteration manner. In the l+1-th loop, a new estimate for $\Theta$ is obtained and denoted by $\Theta_{l+1}$. $\Theta_{l+1}$ is computed based on training data and $\Theta_l$, which is the estimate obtained in the l-th loop. The iteration procedure is guaranteed to converge to a solution $\Theta$ that yields a local maximum value for the target likelihood function $\log(\Theta|S)$. In applying EM algorithm, the system determines $Q(\Theta,\Theta_l)$ and maximizes $Q(\Theta,\Theta_l)$ in each loop. These are the so-called expectation step and maximization step. The following equations hold for a mixture model $$Q(\Theta, \Theta_l) = \sum_{c=1}^{C} \sum_{s \in S} \log[p_c(s \mid \Theta)] p(c \mid s, \Theta_l) + \sum_{c=1}^{C} \sum_{s \in S} \log(\pi_c) p(c \mid s, \Theta_l) \quad (1)(2)$$

where $p(c|s,\Theta_l)$ is the posterior probability of assigning s to CTMC c. It can be computed via Bayes' theorem that $$p(c \mid s, \Theta_l) = \frac{\pi_c p(s \mid \theta^c)}{\sum_{k=1}^{C} \pi_k p(s \mid \theta^k)}$$

wherein and $\Theta^k$ are $\pi_k$ known from $\Theta_l$, so $p(c|s,\Theta_l)$ is determinable.

In ((2)), $p_c(s|\Theta)$ is the probability of generating a sequence s from CTMC c which takes parameters from $\Theta$. Its mathematical form can be derived is as following $$p_c(s \mid \Theta) = p_c(s \mid \theta^c) = \prod_{j=1}^{l(s)-1} q_{s_j, s_{j+1}}^{C} p\left(\lambda_{b_j}^{C}(s), b_{j+1}(s), t_{j,j+1}(s)\right) \quad (3)$$

where $$p(\lambda_{b_j}^{C}(s), b_{j+1}(s), t_{j,j+1}(s))$$

is the a priori probability of observing a transition delay $t_{j,j+1}(s)$ given that the delay follows an Exponential distribution with a parameter $$\lambda_{b_j}^{C}(s), b_{j+1}(s).$$

Such a probability is determined by the following function $$p(\lambda, t) = \begin{cases} e^{-\lambda \frac{t}{\Delta t}}(1 - e^{-\lambda}), & t \le t_{max} \\ e^{-\lambda \frac{t_{max}}{\Delta t}}(1 - e^{-\lambda}), & t > t_{max} \end{cases} \quad (4)$$

where $\Delta t$ and $t_{max}$ are two user-defined constants. $p(\lambda,t)$ returns a fixed yet small probability when the transition delay t is larger than $t_{max}$. When t is less than or equal to $t_{max}$, $p(\lambda,t)$ returns the accumulated Exponential density probability over the time interval $$\left[\frac{t}{\Delta t}, \frac{t}{\Delta t} + 1\right].$$

In fact, alternative function forms can be chosen for $p(\lambda,t)$. Here ((4)) is chosen is because it is more tractable. The parameters $t_{max}$ and $\Delta t$ should be carefully chosen because they affect the model accuracy and its sensitivity with respect to different properties of sequences.

Now $Q(\Theta,\Theta_l)$ in ((1) is maximized. The two parts on the right side are independent and can be maximized separately. To maximize the first part, by substituting ((3)) ((4)) into the first part:

$$\sum_{c=1}^{C} \sum_{s \in S} \sum_{j=1}^{l(s)-1} \left(\log q_{b_j}^{C}(s), b_{j+1}(s) - \lambda_{b_j}^{C}(s), b_{j+1}(s) t_{j,j+1}^{*}(s) + \log \lambda_{b_j}^{C}(s), b_{j+1}(s)\right) p(c \mid s, \Theta_l) \quad (5)$$

where $$t_{j,j+1}^{*}(s) = \frac{t_{j,j+1}(s)}{\Delta t}$$

if $t_{j,j+1}(s) \le t_{max}$; otherwise $$t_{j,j+1}^{*}(s) = \frac{t_{max}}{\Delta t}.$$

Note that the derivation of ((5)) uses an approximation $1-e^{-\lambda} \approx \lambda$.

To maximize ((5)) with respect to each transition parameter, a transition from state u to state v is done in CTMC c. The transition may appear in a sequence s for an arbitrary number of times. I(s, u, v) denotes the frequency that the transition appears in s. $\Gamma(s, u, v)$ denotes the aggregate duration for all such transitions. Again, in computing $\Gamma(s, u, v)$ the previously defined $t_{u,v}^{*}(s)$ is used whenever $t_{u,v}(s)$ is involved. Since transition probabilities are constrained by $$\sum_{v=1}^{M} q_{uv}^{c} = 1$$

for every u, the Lagrange multiplier method is used to maximize ((5)) with respect to $q_{u,v}^{c}$ and $\lambda_{u,v}^{c}$. The following equations are obtained:

$$q_{u,v}^{c} = \frac{\sum_{s \in S} I(s, u, v) p(c|s, \Theta_l)}{\sum_{i=1}^{M} \sum_{s \in S} I(s, u, i) p(c|s, \Theta_l)} \quad (6)(7)$$

$$\lambda_{u,v}^{c} = \frac{\sum_{s \in S} I(s, u, v) p(c|s, \Theta_l)}{\sum_{i=1}^{M} \sum_{s \in S} \Gamma(s, u, i) p(c|s, \Theta_l)}$$

Next, the second part of the right side in ((1)) is maximized with respect to $\pi_c$. Again the Lagrange multiplier method is applied because of the constraint $$\sum_{c=1}^{C} \pi_c = 1.$$

$\pi_c$ is solved as $$\pi_c = \frac{\sum_{s \in S} p(c|s, \Theta_l)}{N} \quad (8)$$

The three equations, ((6)) ((7)) and ((8)), comprise the parameter estimation process at the l+1-th loop of the iteration procedure.

Using protocol knowledge to fix certain parameters, certain parameters are fixed to constants by using the prior knowledge on involved networking protocols. This not only improves the model accuracy, but also reduces computational complexity because the fixed parameters no longer participate in the parameter estimation procedure. Both transition probabilities and rates can be fixed. Below are two commonly used strategies:

if a transition from state u to state v is impossible in reality, the corresponding transition probability can be set to zero; For example, in the TCP case, it is known that a FIN packet is never followed by a SYN in the same connection. Accordingly, the probability for the transition from "FIN" state to "SYN" state is set to zero. Clearly, in this case the rate for the involved transition also needs to be fixed.

if a transition from state u to state v is always finished in very short time, the corresponding transition rate can be fixed to a large constant; for the VoIP example: RING and OK messages are always sent together by the VoIP server. Thus their corresponding transition rate is set to a large constant.

Because the model is a collection of multiple CTMCs, prior to any probability (or rate) fixing for the transition between state u and v, the number of CTMCs this operation should be applied to needs to be selected. In principle, such a decision depends on the confidence level on the domain knowledge. A high confidence level implies that the knowledge always holds in reality and no exceptions will happen; if this is true, the parameter fixing operation should be applied to all the CTMCs. Otherwise, only a subset of CTMCs can have their parameters fixed in the hope that the other CTMCs can still adjust their parameters to model exceptions.

Next, the selection of initial values for free parameters will be discussed. After certain parameters are fixed with domain knowledge, the rest are undecided parameters and will be estimated via the iterative procedure. Prior to the iteration procedure, initial values are assigned to them. In practice, random numbers are used as the initial values. A normalization operation is added to ensure that those initial values satisfy constraints such as $$\sum_{c=1}^{C} \pi_c = 1$$

and $$\sum_{j=1}^{M} q_{ij}^{c} = 1.$$

As EM algorithm only guarantees local optimality, accuracy of the method is affected by the initial values. Accordingly, the model training process is repeated multiple times (10 in this work) with different random seeds. The model having the best compliance with the convergence criterion (see Line 6 in FIG. 4). Regarding the convergence criterion, $Q(\Theta, \Theta_l)$ is computed upon the finish of the l-th loop. If $$\frac{|Q(\Theta, \Theta_l) - Q(\Theta, \Theta_{l-1})|}{Q(\Theta, \Theta_{l-1})} < \delta$$

($\delta$ is a user-defined threshold which is set to 0.05% in the experiments), the iteration is terminated.

Next, the selection of C is done. C (the total number of CTMCs) is selected prior to the iteration procedure. Selecting an appropriate value for C is needed because it balances model accuracy with complexity. The method uses the Akaike Information Criterion (AIC) which is defined as $$AIC(\Theta) = -2 \log p(S|\Theta) + 2U$$

where U is the free parameter number in the model. It is easy to show that the total parameter count of the model is $C(2M^2 - 7M + 6) - 1$. After using protocol knowledge to fix certain parameters, U should be much smaller than the total parameter count. The introduced AIC measures the goodness of fit for models. A chosen C that minimizes $AIC(\Theta)$ is interpreted as a good balance between model accuracy and complexity. In applying AIC, an upper bound for C is selected and then the system searches below the upper bound for a choice of C that minimizes $AIC(\Theta)$. How to choose the upper bound depends on the number of states in each CTMC, as well as the prior knowledge on how heterogeneous the sequence behavior could be. A high upper bound should be chosen if CTMC has many states or the sequence behavior are highly heterogeneous.

The major computational complexity is caused by the three equations ((6)) ((7)) and ((8)). Their required complexity is to multiply N by the total number of free parameters, which is bounded by $O(CM^2)$. Prior to solving these three equations, ((3)) and ((4)) must be computed. While Equation ((3)) requires $O(CN)$, Equation ((4)) involves an Exponential function which can be replaced by a lookup table in implementation. So the complexity for ((4)) is $O(M^2)$. Overall, the computational complexity in one iteration is upper bounded by $O(NCM^2+CN+M^2) \approx O(NCM^2)$. This complexity is multiplied by the number of iterations. This number is less than twenty in all the experiments.

As mentioned above, the presented model is expected to characterize two aspects of the sequence behavior: the sequential pattern constituted by symbols, and durations between symbols. It is important to understand the model sensitivity with respect to each aspect because this decides the capability of the model in distinguishing sequences with different behavior. In this section the model sensitivity is analyzed. An example shows how the model sensitivity is affected by parameter selection. The model sensitivity can be tailored according to application requirements.

Figure 5:
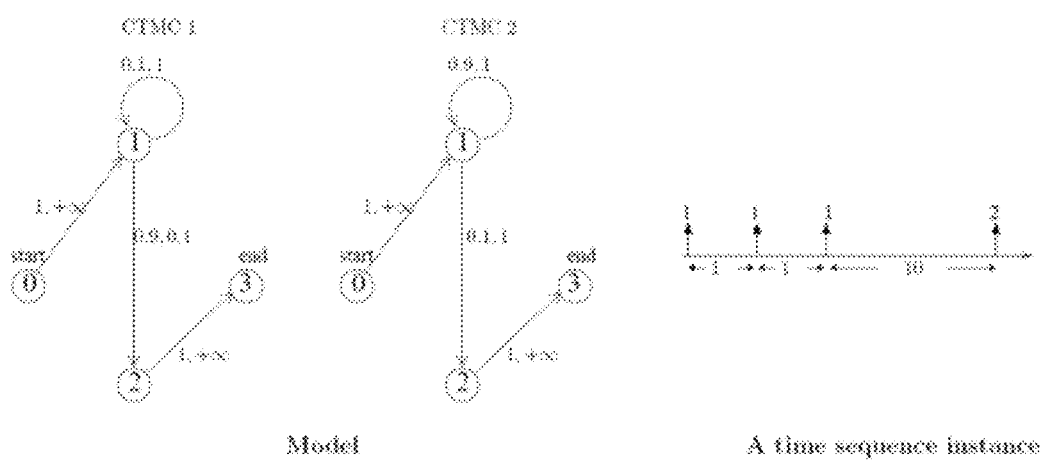
FIG. 5 shows a mixture model of two CTMCs and an observed event sequences.

FIG. 5 shows a mixture model of two CTMCs and an observed event sequence s. The two CTMCs are assumed to have equal mixture probability. In the two CTMCs only those edges with non-zero transition probabilities are depicted. Each edge is labeled by its transition probability and rate. The likelihood for s being generated by CTMC 1 and 2, respectively, is determined. In CTMC 1, the expected transition delay from state 1 to itself is 1, and the expected delay from state 1 to 2 is $1/0.1=10$. These two numbers are consistent with their respective observations in s. Therefore, if transition delay is the primary concern, s is more likely generated by CTMC 1 since in CTMC 1 the property of transition delay fits observations well. On the other hand, if the order of symbols is the primary concern, s has a higher chance to be generated from CTMC 2. Because in CTMC 2 the self transition probability at state 1 is much higher (0.9) than in CTMC 1, which better explains the observed multiple consecutive symbol "1". As illustrated by this example, the model has a trade-off between being more sensitive to the order of symbols or to transition durations.

The model sensitivity can be controlled by two parameters: $t_{max}$ and $\Delta t$ (see ((4))). From ((4)), it is clear that the difference of transition delay only matters when the duration is less than or equal to $t_{max}$. If $t_{max}$ is small, the model tends to be insensitive to variance of transition delay. In the last example, if $t_{max}=100$, which is larger than any transition delay in s, and $\Delta t=1$, then the probability of s being generated from each CTMC is as follows $$p(s|\theta^1)=[0.1\times(e^0-e^{-1})]^2\times 0.9\times(e^{-1}-e^{-1.1})$$

$$p(s|\theta^2)=[0.9\times(e^0-e^{-1})]^2\times 0.1\times(e^{-10}-e^{-11})$$

There is $p(s|\theta^1)?p(s|\theta^2)$. Since the two CTMCs have equal mixture probabilities, the model has a higher posterior probability to assign s to CTMC 1 than to CTMC 2. On the other hand, if $\Delta t=10$ and $t_{max}$ is unchanged, there is $p(s|\theta^1)=p(s|\theta^2)$, the assignment becomes different. This example gives the following insight: while a smaller $\Delta t$ makes the model more sensitive to transition delay, a larger $\Delta t$ makes it more sensitive to the order of symbols. In an extreme scenario, to ascertain whether the order of symbols follows certain protocol logic, then $t_{max}=0$. In the other extreme scenario where the system is only interested in duration, $t_{max}$ is made larger than any possible duration values and $\Delta t$ is close to zero.

Lastly, it is possible to specify different $t_{max}$ and $\Delta t$ for different transitions. This feature is particularly useful when transitions have unequal importance. E.g., if a transition is not within the concern, its $t_{max}$ and $\Delta t$ are adjusted to let the mixture model ignore the impact of its variance.

The experiments test the three types of event sequences as mentioned above: TCP SYN/FIN/RST sequences, SIP-based VoIP calls and Wi-Fi user sessions. The sample data is extracted from three network traces, respectively. These include a TCP packet trace collected from a gateway router, a VoIP call traces, and a syslog trace in Wi-Fi wireless networks.

The TCP trace is publicly available and is collected from a border router at UCLA during August 2001. The trace is about 16 hours long. From the trace the SYN, FIN, RST packets are extracted and grouped into event sequences by their flow identities, i.e., the tuple (source IP, destination IP, source port, destination port). In total 505K TCP SYN/FIN/RST sequences were extracted. The VoIP trace is collected from a VoIP testbed. An open-source software SIPp for VoIP call generators was used and another open-source software SER was used as the SIP proxy. SIPp was deployed on twenty PlanetLab nodes and generated calls to the SIP proxy. tcpdump was used to capture packets at the proxy and extract all the call sessions. To make the testbed more realistic, intentionally created packet loss and delayed reply were simulated at both call sender and receiver sides. The trace was about 1.5 h the long with 16K call sessions logged. The third trace was syslog data collected from the campus-wide wireless networks in Dartmouth College. The syslog trace contained all the syslog messages exchanged between Wi-Fi wireless cards and their associated access points. In the experiment, only the trace for one access point was used in the first two weeks of 2003. This selected trace includes 2.2M syslog events which are further grouped into 122K user sessions by using the MAC address.

The method was tested against the three traces on a Intel Xeon(R) 1.60 GHz processor. Table 1 summarizes the experiment settings and basic results. The column "Significant CTMCs" is particularly interesting. It reveals how many popular behavior templates the input sequences have. Such significant CTMCs are closely related to the network protocol underlying the data.

TABLE 1

Experiment settings and basic results ("Significant CTMCs": the number of CTMCs with mixture prob. larger than 5%)

| Data | Δt | $t_{max}$ | C | Significant CTMCs | Run-time |
| --- | --- | --- | --- | --- | --- |
| TCP | 1 sec | 10 min | 6 | 4 | 7 min |
| VoIP | 1 sec | 10 min | 12 | 2 | 90 sec |
| Wi-Fi syslog | 30 sec | 2 hour | 26 | 5 | 8 min |

Two metrics were used to evaluate the accuracy of the method: histogram of sequence size and histogram of sequence duration. Both metrics are self-evident. For either metric, A consistency reported by the comparison of the data and fitted model indicates that the model does capture the input sequence behavior. While computing the histograms for the input data is straightforward, it is difficult to analytically derive the histograms from the created models so Monte Carlo simulations was applied. The comparison is conducted for all the three datasets and the results are provided in FIGS. 6-8. All the figures used a logarithmic scale for the sequence duration axis.

Figure 1:
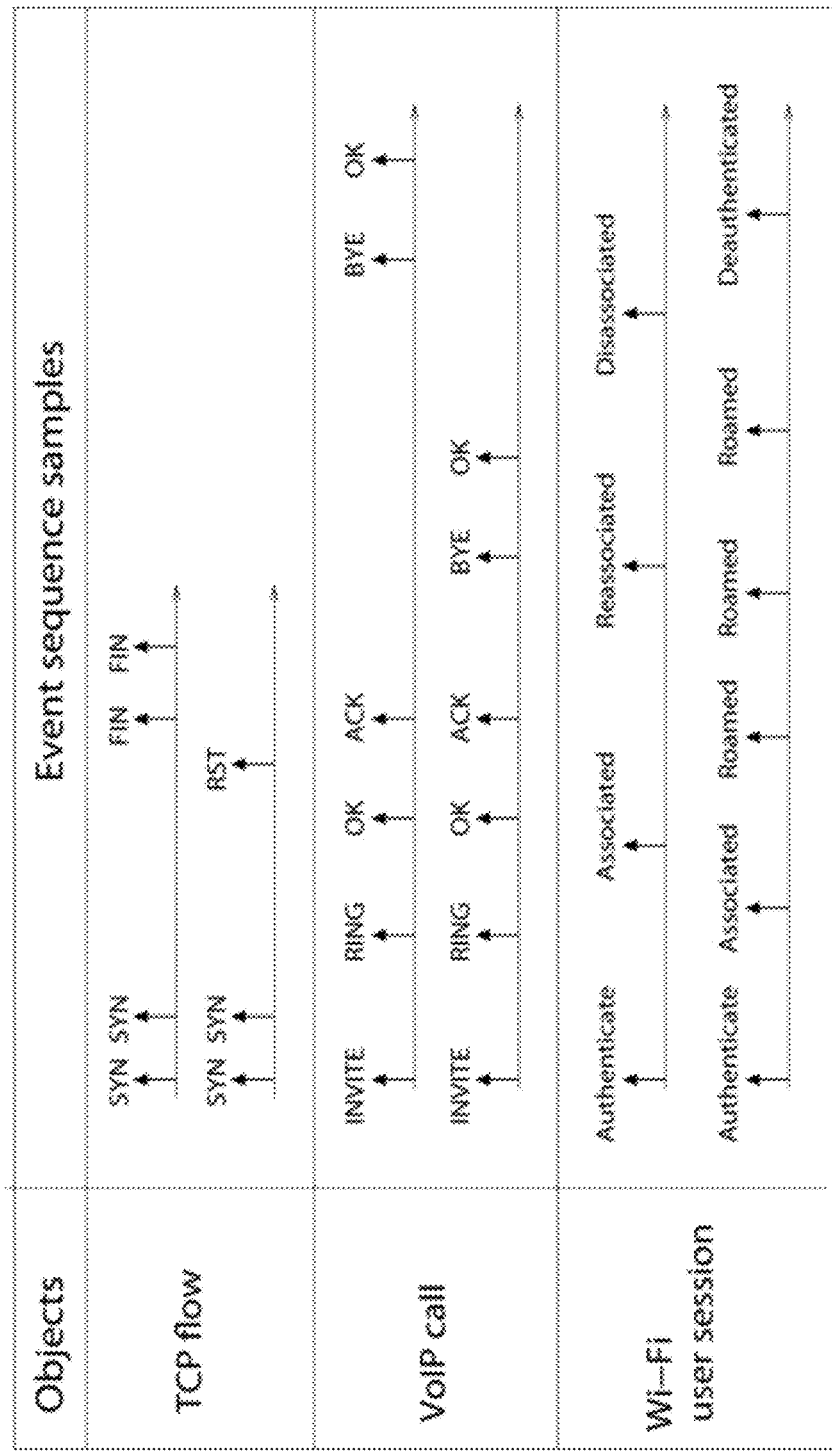
FIG. 1 shows three exemplary event sequence cases.
Figure 6:
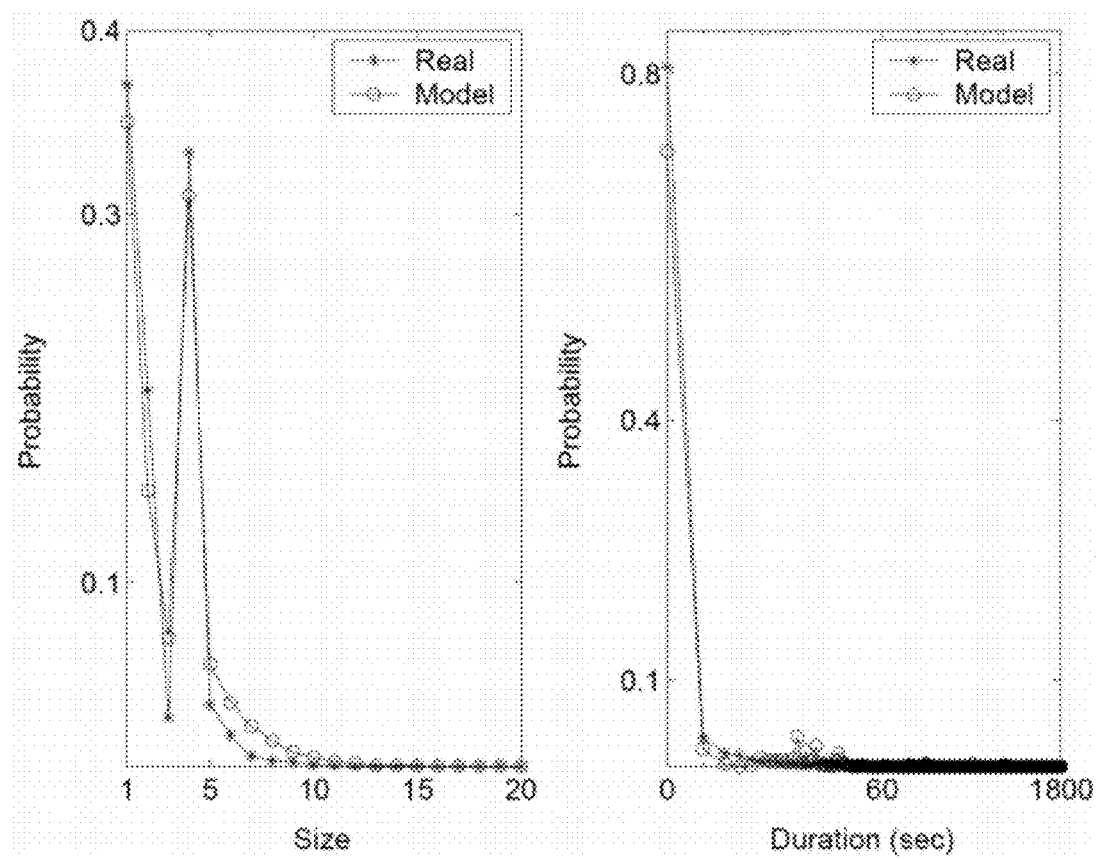
FIG. 6 compares the two histograms on TCP SYN/FIN/RST sequences.
Figure 7:
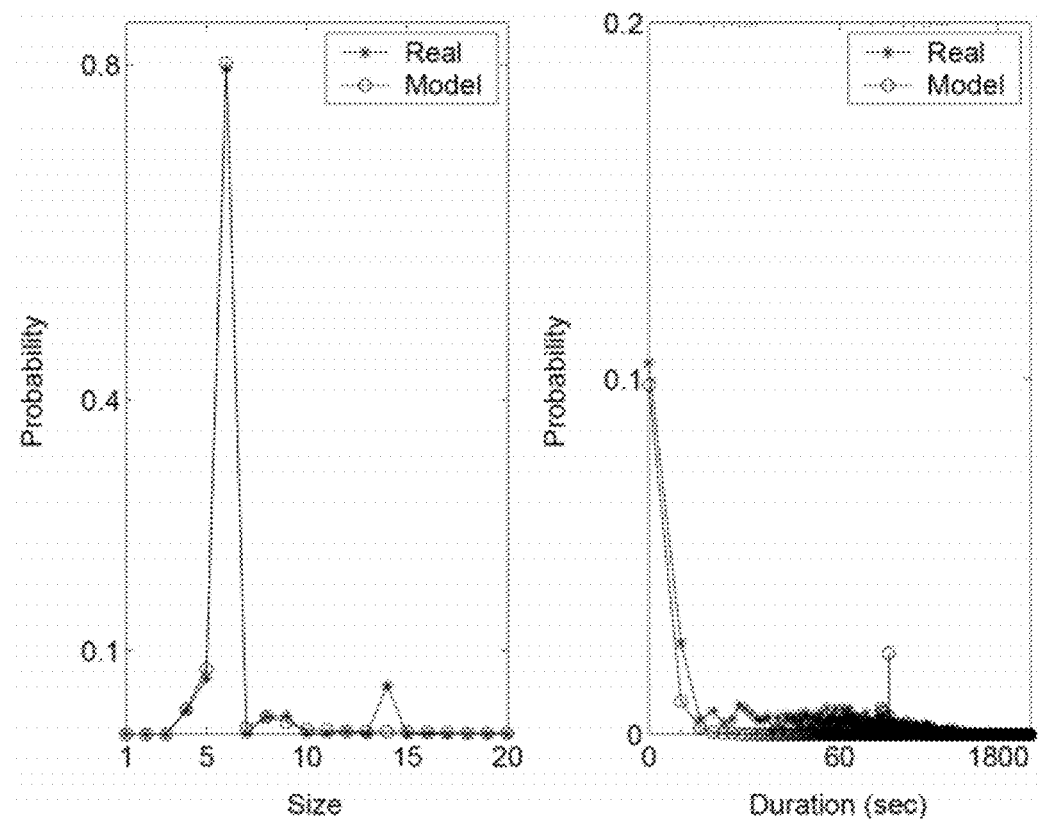
FIG. 7-8 show exemplary histograms for VoIP call sessions.
Figure 8:
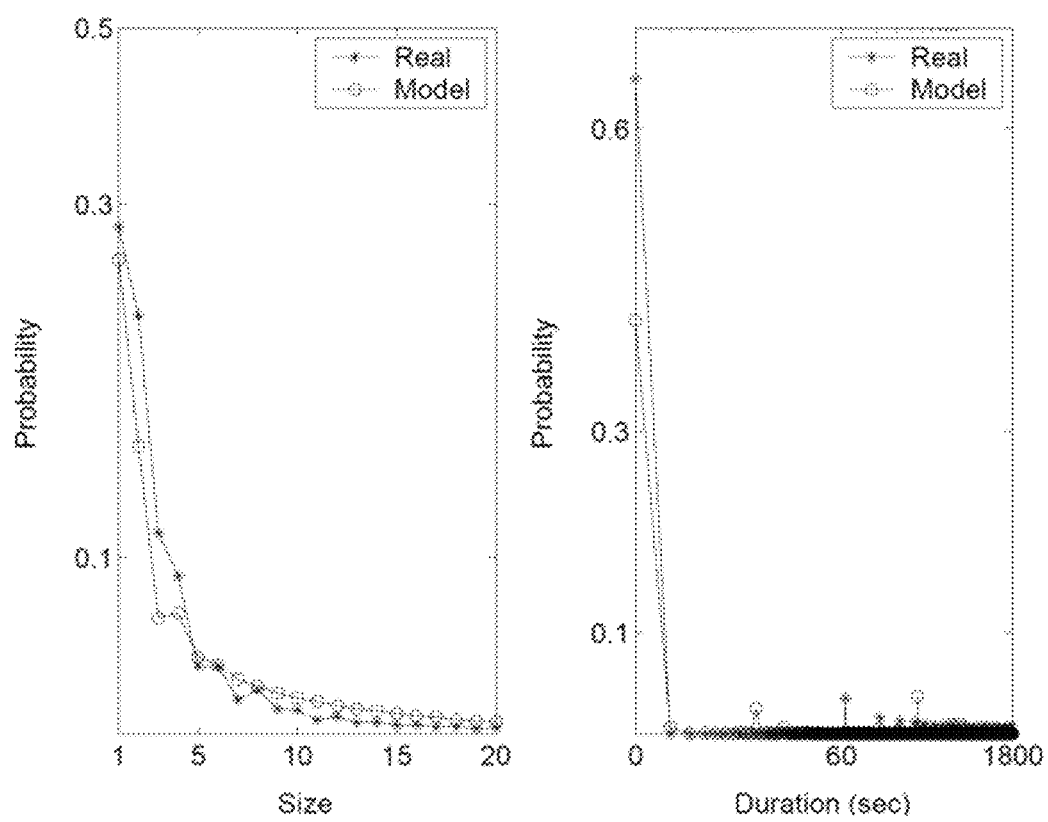

FIG. 6 compares the two histograms on TCP SYN/FIN/RST sequences. The sequence size histogram has two spikes at size 1 and 4 (see the left figure). The spike at size 1 is caused by the fact that many TCP connections have a single SYN without any FIN or RST. The spike at size 4 is caused by the most common case wherein a TCP connection has two SYNs and two FINs. For these two spikes, the model seems to give an accurate explanation. The right side of FIG. 6 shows the histogram of sequence duration. Both the real data and fitted model show that more than 70% TCP connections have durations within one second. FIG. 7 plots the histograms for VoIP call sessions. The VoIP call size histogram has a sharp spike at size 6. This corresponds to the most typical VoIP call pattern shown in FIG. 1. On the other hand, the VoIP call duration have a relatively flat distribution. In each case, the model displays similar statistics to the real data. Last, the histogram of Wi-Fi user session size is relatively flat, yet the histogram of session duration is uneven.

Figure 9A:
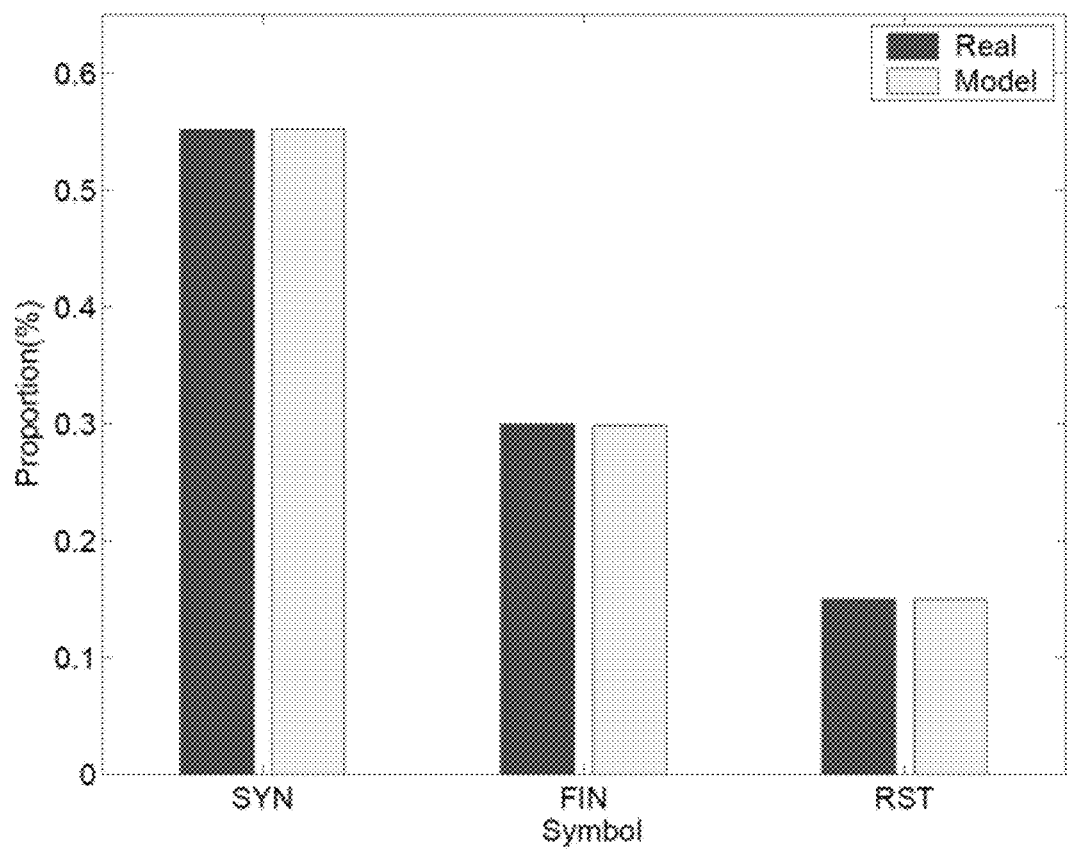
FIG. 9 shows a comparison of histogram for discrete symbols.
Figure 9B:
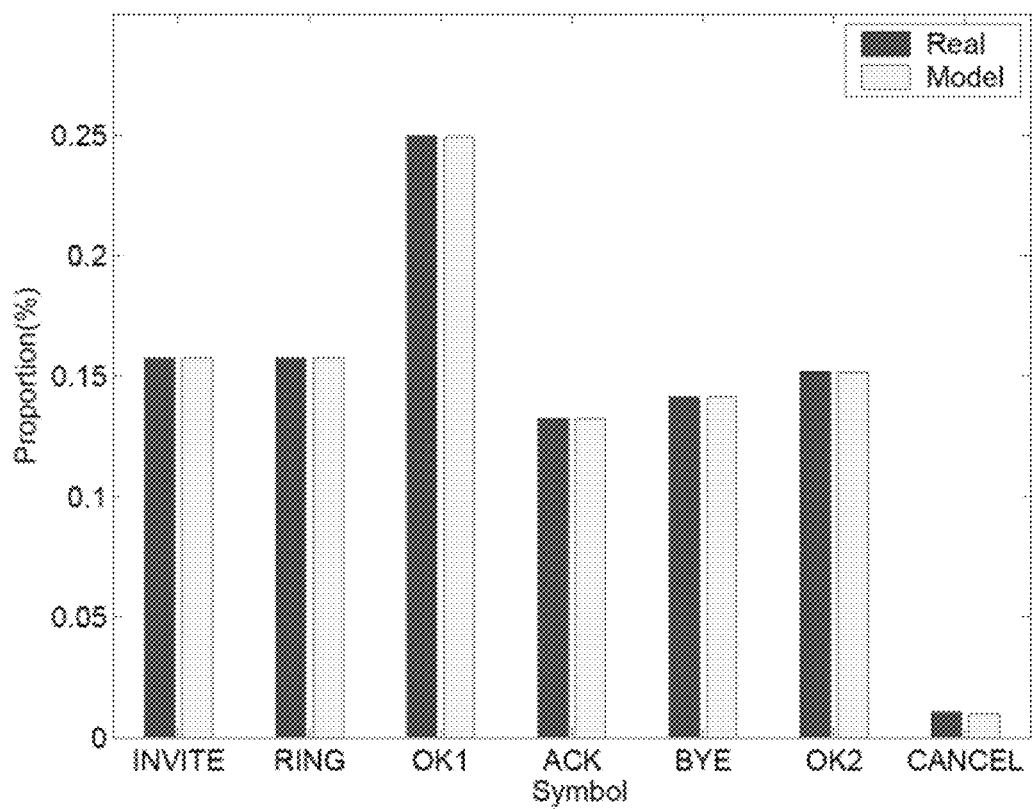
Figure 9C:
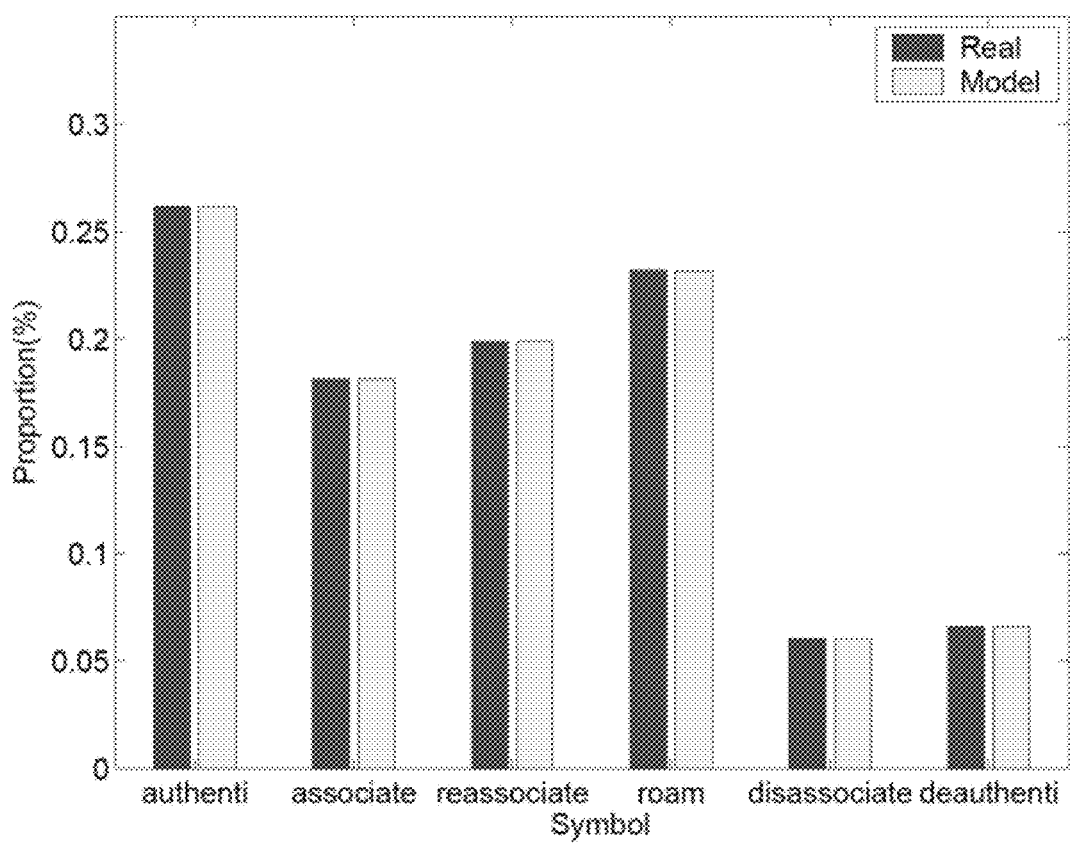

The histogram of sequence size is further broken down to examine the histogram of each discrete symbol. The comparison results are shown in FIG. 9. FIG. 9 demonstrates that the model matches the real data extremely well in terms of histograms of discrete symbol values.

Next the applications of the method are discussed with two showcases. The first showcase is a visualization tool that allows network operators to conduct exploratory data analysis; the second showcase is a novel anomaly detection mechanism.

In the exploratory data analysis application, by nature of the mixture model, the method classifies input event sequences into different CTMCs. Each CTMC is a cluster that profiles a group of sequences with similar behavior. This feature is attractive to various exploratory data analysis tasks such as monitoring dominant traffic trend, detecting outliers, developing alternative parsimonious traffic model.

Figure 10:
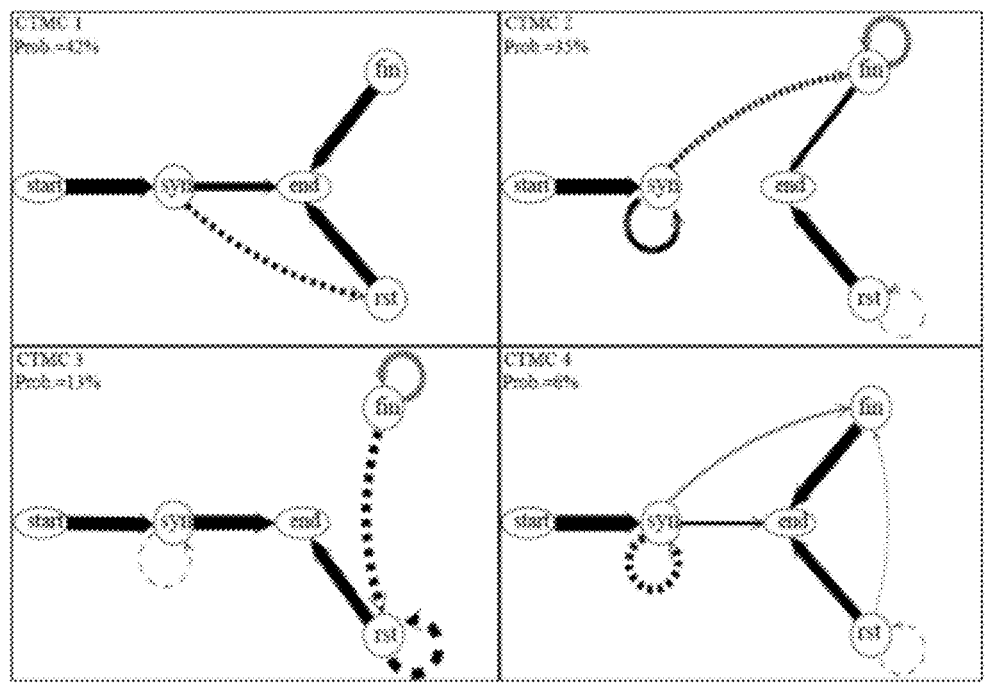
FIG. 10 shows an exemplary visualization of CTMCs.
Figure 11:
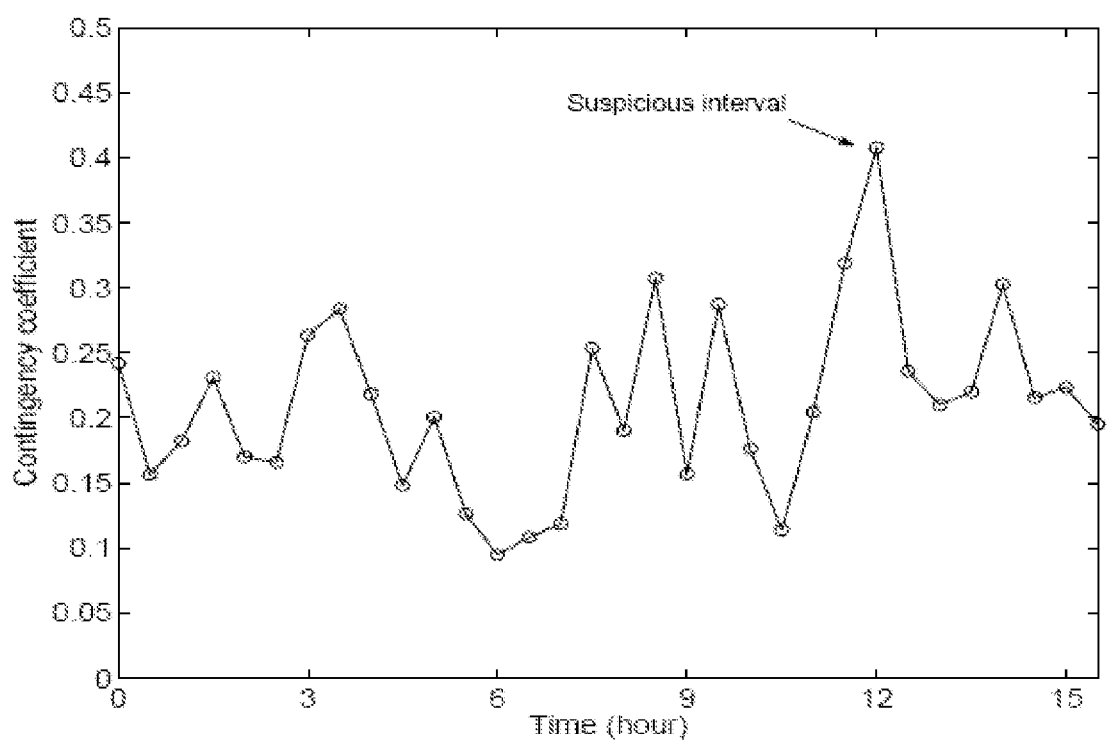
FIG. 11 shows an anomaly score chart for TCP sequences.

As a showcase, a tool was developed to visualize the clusters produced by the method. Its purpose is to use graphic display to aid network operators' understanding on large volume of event sequence dataset. FIG. 10 shows a visualization of the most significant CTMCs after building models for the TCP SYN/FIN/RST dataset. Transition probabilities in each CTMC are encoded by thickness of the edges. A thicker edge indicates a higher probability and vice versa. Edges with transition probabilities smaller than 5% are pruned in the figure. Transition rates are encoded by the ratio of dash length and dash gap of the edges. A more scattered dashed line indicates a smaller transition rate, i.e., a longer expected transition delay.

FIG. 10 shows the tool's display of the significant clusters after modeling the TCP dataset. The tool has one unique feature: it encodes the transition delay and rate parameters by thickness and scattering of the corresponding edge respectively. This feature, along with the mixture probability numbers appearing on the display, enables the operators to have a coarse, yet immediate estimate of the status of the overall data. For example, by looking at CTMC 1 in the figure, 42% of TCP connections either has only a SYN or has a SYN and a RST. For CTMC 2, 35% of TCP connections have both SYN and FIN. Since the SYN and FIN have non-negligible self transition probabilities in this case, these 35% TCP connections may have multiple consecutive SYNs (FINs). Moreover, if consecutive SYNs occur, their intermediate duration is quite short. While for consecutive FINs, the duration is relatively long. CTMC 4 reveals that 13% of TCP connections have a single or multiple consecutive SYNs. CTMC 4 reveals that 6% of connections have a high chance of having multiple consecutive SYNs, followed by zero or one FIN.

In the above scenario, the tool displays only the significant CTMCs by pruning those insignificant ones. This enables operators to promptly catch the dominant trend hidden in the data and take actions if necessary. For example, it is well known that most TCP RSTs are caused by the implementation of certain Web browsers, network outages, or malicious attacks. If the visualization tool reveals that the popularity of TCP RSTs is increasing sharply, operators are alarmed and they should examine whether a TCP reset attack is launched. On the other hand, the tool can also display those insignificant, yet possibly unusual behavior. Enabling the option or not is purely subject to operators' requirements.

Turning now to anomaly detection, because the modeling approach provides one way to describe the behavior of network objects, it is readily applicable to anomaly detection whose duty is essential to distinguish abnormally-behaved objects from normally-behaved ones. There could be many ways to design an anomaly detection method. Nevertheless, a simple method can use the modeling method and the visualization tool mentioned earlier.

In anomaly detection two sets of event sequences are analyzed: S and $\hat{S}$. While S are known to be clean without anomalies, $\hat{S}$ are the test dataset may have anomalies. In reality, $\hat{S}$ could be generated by one host or user, or the data collected in a monitoring period. The goal of the anomaly detection technique is to determine whether the behavior of $\hat{S}$ is different from S based on certain criteria. If different, $\hat{S}$ is reported to contain anomalies.

First, a model $\Theta$ is built for S. $\Theta$ is considered to represent the normal behavior. In principle another model for $\hat{S}$ can be built and compared to $\Theta$. If the two models have significantly different parameter values, $\hat{S}$ contains anomalies. Despite its seemingly simplicity, this approach suffers from one drawback: training two models are time-consuming and $\hat{S}$ is usually small and insufficient for training a reliable model. Therefore, after obtaining $\Theta$, the system extracts the mixture probabilities $\pi_c$ from $\Theta$. $\pi_c$ are the a priori probability for a sequence coming from CTMC c. Such a distribution is denoted by P(CTMC c)=$\pi_c$. This distribution represents the normal behavior. Next, $\Theta$ is applied to calculate the membership probability $p(c|s,\Theta)$ for every s in $\hat{S}$. $p(c|s,\Theta)$ is the probability for assigning s to CTMC c. It satisfies the constraint $$\sum_{c=1}^{C} p(c|s, \Theta) = 1.$$

The system computes $$E_c = \sum_{s \in \hat{S}} p(c|s, \Theta),$$

$$c = 1, 2, \ldots, C$$

where $E_c$ shall be interpreted as the number of sequences in $\hat{S}$ that are assigned to CTMC c. It is also called the observed frequency count for CTMC c.

Clearly, if the sequence behavior in $\hat{S}$ and in S are similar, the observed frequency counts $E_1, \ldots, E_C$ should follow the a priori distribution P(CTMC c)=$\pi_c$. Thus this fact is the basis for anomaly detection. Specifically, the system applies $\chi^2$ (chi-square) statistics to measure the fitness between the observed frequency counts and the distribution, that is, compute $$\chi^2 = \sum_{c=1}^{C} \frac{(|\hat{S}|\pi_c - E_c)^2}{E_c}$$

where $|\hat{S}|$ is the size of $\hat{S}$, $|\hat{S}|\pi_c$ is the expected frequency count for CTMC c. Because the value of $\chi^2$ is affected by $|\hat{S}|$, it is normalized in the following way $$C_c = \sqrt{\frac{\chi^2}{\chi^2 + |\hat{S}|}}$$

The above $C_c$ is usually called contingency coefficient. Since it is normalized to be between zero and one, it is readily used to measure how likely an anomaly is detected. It equals zero when $\hat{S}$ exhibit identical behavior as S; and it equals one when their behavior do not resemble at all. In practice, a high value of $C_c$ indicates $\hat{S}$ might be anomalies and require a closer examination.

Overall, the presented technique requires to build a mixture model for a clean set of sequences. This only needs to be done occasionally under a reasonable assumption that the normal behavior does not change frequently. For each testing sample set $\hat{S}$, the technique only needs to compute the membership probability for each sample. The technique is light-weighted and can be performed either online or offline.

Figure 12:
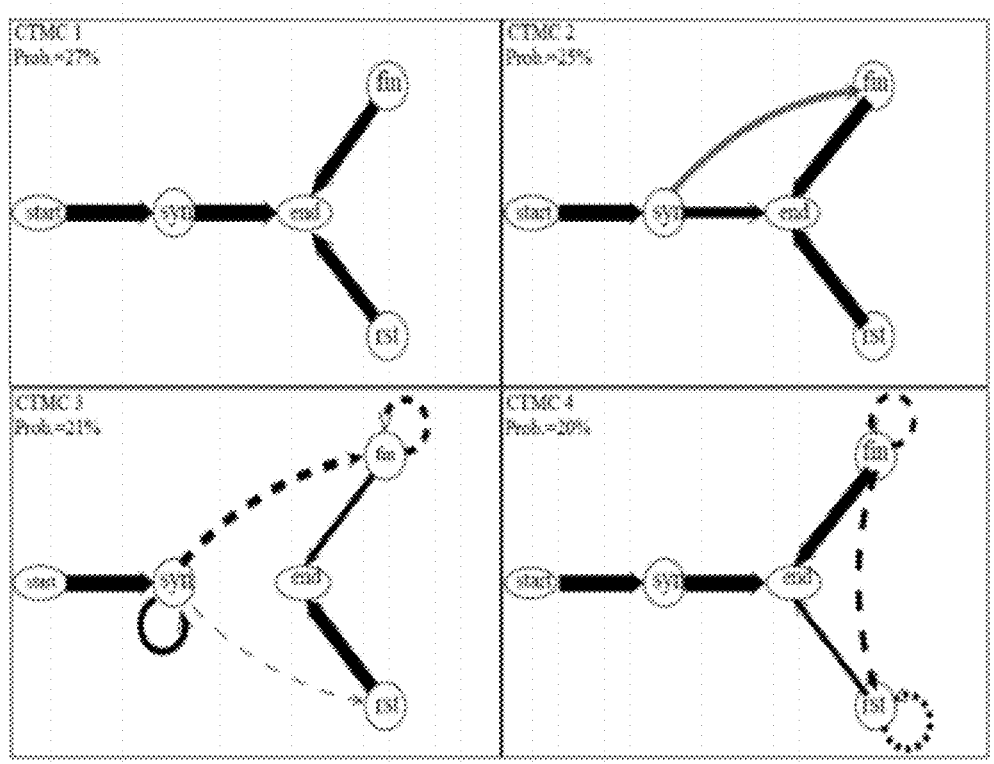
FIG. 12 shows a visualization of significant CTMCs for a period of time.

For the purpose of evaluation, the technique conducts an offline anomaly detection on the aforementioned TCP dataset. Since there is no clean dataset, the mixture probability distribution computed from the entire dataset is used to represent normal behavior. This is valid as long as the proportion of anomalies in the entire dataset is small. The system then divides the 16-hour trace into 30-minute intervals and computes the contingency coefficient for every interval. The results are shown in FIG. 12 which shows a contingency coefficient larger than 0.4. This value is relatively high and indicates a suspicious interval. The modeling of sequences in the suspicious interval is done so to reveal more information. A model is trained by using the 13K TCP sequences in the suspicious interval. The visualization tool is used to display the modeling results which is shown in FIG. 12. It is interesting to make a visual comparison between FIG. 12 and FIG. 10, which is assumed to reflect the normal behavior. By reading the mixture probability numbers and estimating the thickness of edges on the two figures, in the suspicious interval a much higher proportion of TCP connections contains only a single SYN without FIN or RST. Specifically, in the suspicious interval this percentage is about 60%. While in the normal behavior model the percentage is about 33%.

Figure 13:
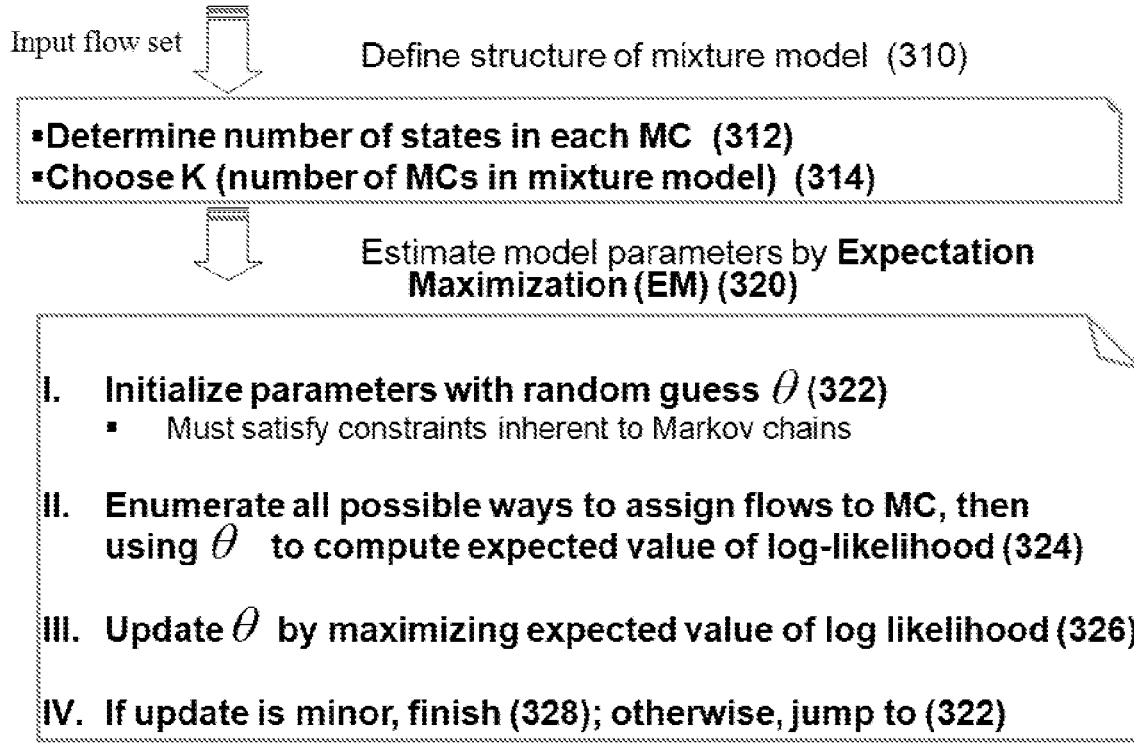
FIG. 13 shows a second embodiment of a learning model.

FIG. 13 shows a second embodiment of a learning model. In this model, the system defines a structure for the mixture model (310) and then estimate model parameters such as by EM (320). In (310), the system determines the number of states in each Markov chain (MC) (312) and then chooses K, the number of MCs in the mixture model (314). In (320), the system initializes parameters with a random guess (322). Next, the process enumerates all possible flows to the MCs and then computes an expect value of log-likelihood (324). The process then updates the random guess by maximizing the expected value of log likelihood (326). If the update value is below a predetermined threshold, the system exits. Otherwise, the process loops to (322) to continue the estimation of the model parameters.

Automatic profiling of massive event sequences is critical for a variety of network measurement and monitoring tasks. The above embodiment automatically captures the behavior hidden in massive event sequences. The approach is based on a mixture model—a collection of continuous-time Markov chains. The most salient feature of the model is that it simultaneously captures both the order of events and duration between events. Prior domain knowledge on the event sequences can be seamlessly integrated into the model to improve accuracy and to reduce complexity. To estimate parameters of the model, an iterative algorithm based on the Expectation Maximization algorithm is used. The method is then applied to multiple network traces, including a TCP packet trace, a VoIP call collection and Wi-Fi syslog and the experimental results demonstrate that the method yields a high consistency with the real data. Furthermore, the method can be applied to two exemplary network monitoring tasks: 1) the visualization tool can be used for conducting exploratory traffic analysis and 2) an anomaly detection scheme that is light-weighted and can be used online or offline.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:
1. A method to profile event sequences, comprising:
  creating a mixture model stored on a non-transitory machine readable storage medium that simultaneously characterizes event pattern and time information;

estimating parameters for the mixture model;
applying the mixture model to profile event sequences in computer networks, wherein the mixture model characterizes at least two behaviour aspects including TCP SYN/FIN/RST dataset; and
displaying transition delay and rate parameters by thickness and scattering of corresponding edge(s) wherein the rate parameters and edge(s) are shown in a graph.

2. The method of claim 1, wherein the mixture model comprises multiple first order Markov chains whose transitions have two parameters: transition probability and transition rate.

3. The method of claim 1, comprising adding constraints to the mixture model by using domain knowledge.

4. The method of claim 1, comprising selecting a number of Markov chains in the mixture model by using domain knowledge.

5. The method of claim 1, comprising estimating parameters using an Expectation Maximization process.

6. The method of claim 1, comprising visualizing the mixture model.

7. The method of claim 6, comprising using dotted line to display a transition and setting the ratio of dash length and dash gap in proportion to a function of average transition delay.

8. The method of claim 7, comprising setting the thickness of each transition in proportion to transition probability.

9. The method of claim 1, comprising detecting network anomalies based on the mixture model.

10. A system to profile event sequences, comprising:
a mixture model stored on non-transitory machine readable storage medium that simultaneously characterizes event pattern and time information;
a parameter estimator coupled to the mixture model; and
a user interface module to apply the mixture model to profile event sequences in computer networks, wherein the mixture model characterizes at least two behaviour aspects including TCP SYN/FIN/RST dataset, wherein the user interface module displays transition delay and rate parameters by thickness and scattering of corresponding edge(s) and wherein the rate parameters and edge(s) are shown in a graph.

11. The system of claim 10, wherein the mixture model comprises multiple first order Markov chains whose transitions have two parameters: transition probability and transition rate.

12. The system of claim 10, comprising adding constraints to the mixture model by using domain knowledge.

13. The system of claim 10, wherein the mixture model comprises a number of Markov chains selected by using domain knowledge.

14. The system of claim 10, wherein the parameter estimator comprises an Expectation Maximization process.

15. The system of claim 10, comprising a graphical user interface (GUI) to visualize the mixture model.

16. The system of claim 15, wherein the GUI uses dotted line to display transition and sets the ratio of dash length and dash gap in proportion to a function of average transition delay.

17. The system of claim 15, wherein the GUI sets the thickness of each transition line in proportion to transition probability.

18. The system of claim 10, comprising a verifier to detect network anomalies based on the mixture model.

* * * * *